(12) United States Patent
Straub

(10) Patent No.: US 6,378,241 B1
(45) Date of Patent: Apr. 30, 2002

(54) ACCESSORY FOR A FISHING ROD

(76) Inventor: Eberhard Straub, Am Schnittelberg 36, Bad Soden (DE), 65812

( * ) Notice: Subject to any disclaimer, the term of this patent is extended or adjusted under 35 U.S.C. 154(b) by 0 days.

(21) Appl. No.: 09/462,594

(22) PCT Filed: Jul. 2, 1998

(86) PCT No.: PCT/DE98/01880

§ 371 Date: Jan. 7, 2000

§ 102(e) Date: Jan. 7, 2000

(87) PCT Pub. No.: WO99/02031

PCT Pub. Date: Jan. 21, 1999

(30) Foreign Application Priority Data

Jul. 8, 1997 (DE) .......................................... 197 29 120

(51) Int. Cl.⁷ .............................................. A01K 93/00
(52) U.S. Cl. ...................................... 43/44.91; 43/44.9
(58) Field of Search .............................. 43/44.88, 44.9, 43/44.91

(56) References Cited

U.S. PATENT DOCUMENTS

| | | | | |
|---|---|---|---|---|
| 717,237 A | * | 12/1902 | Marsters ..................... | 43/44.91 |
| 2,208,240 A | * | 7/1940 | Arnesen et al. ............ | 43/44.91 |
| 2,226,331 A | * | 12/1940 | Allison ...................... | 43/44.91 |
| 2,326,510 A | * | 8/1943 | Worden ..................... | 43/44.91 |
| 2,654,177 A | * | 10/1953 | Cope et al. ................ | 43/44.91 |
| 2,694,878 A | * | 11/1954 | Martens ..................... | 43/44.91 |
| 2,726,476 A | | 12/1955 | Coughlin | |
| 2,908,991 A | | 10/1959 | Bobber | |
| 3,012,359 A | * | 12/1961 | Foster ........................ | 43/43.14 |
| 3,341,965 A | * | 9/1967 | Purcella ..................... | 43/44.91 |
| 3,353,294 A | * | 11/1967 | Mundorff et al. .......... | 43/44.91 |
| 3,370,376 A | | 2/1968 | Winn | |
| 3,443,336 A | | 5/1969 | Reese | |
| 3,875,695 A | | 4/1975 | Futch, Jr. | |
| 4,571,874 A | * | 2/1986 | Smaw .......................... | 43/4.5 |
| 4,757,635 A | | 7/1988 | Cole | |
| 5,117,576 A | * | 6/1992 | Lasiter ....................... | 43/44.9 |
| 5,361,532 A | * | 11/1994 | Moff .......................... | 43/44.9 |
| 5,404,669 A | | 4/1995 | Johnson | |
| 5,937,565 A | * | 8/1999 | Maric et al. ................... | 43/15 |

FOREIGN PATENT DOCUMENTS

DE        B23-41 283        8/1997

* cited by examiner

Primary Examiner—Kurt Rowan
(74) Attorney, Agent, or Firm—Watts, Hoffmann, Fisher & Heinke Co.

(57) ABSTRACT

The invention relates to a fishing rod accessory having simple design which is connected to a traditional float (1). As a result, a cast bait can be lifted or lowered, as if by remote control, by corresponding movements of the fishing rod. The inventive accessory consists of a hollow body (4) which can be rapidly flooded via the two end openings (for the fishing line (3) to be passed through), and a (submersible) ball (6) lodged inside the hollow body (4). Said ball (6) frees the passage of the line (3), when the hollow body (4) is in horizontal position, by rolling into a trough-shaped hollow, whereas it blocks this passage after swinging around an axis (5a) (i.e. in vertical position) by jamming, together with the line, in the circular and funnel-shaped outlet opening, when the position in question is stabilized (until the next fishing rod) manoeuvre).

7 Claims, 3 Drawing Sheets

FIG. 1A
FIG. 1B
FIG. 1C
FIG. 1D
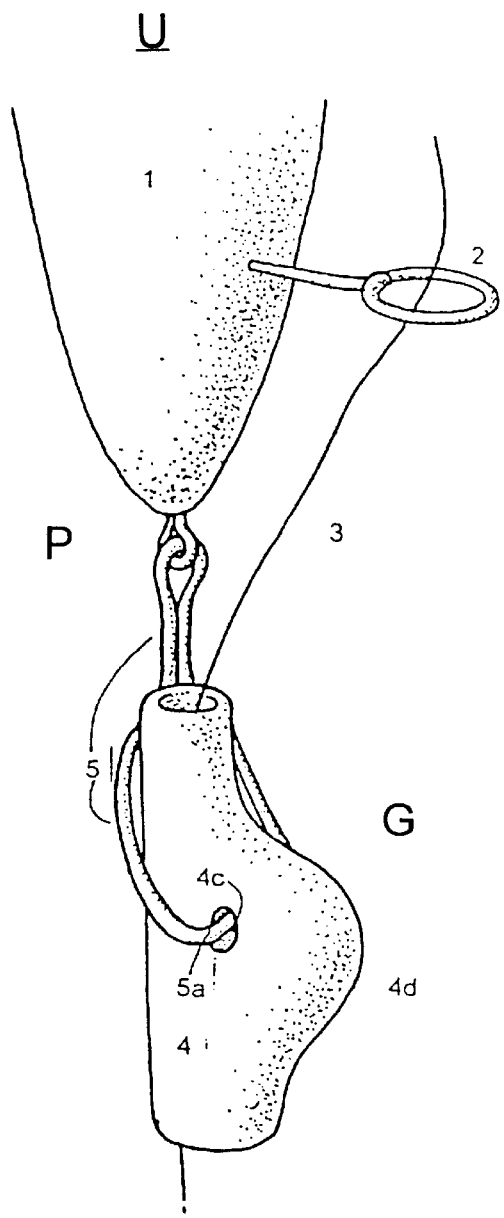
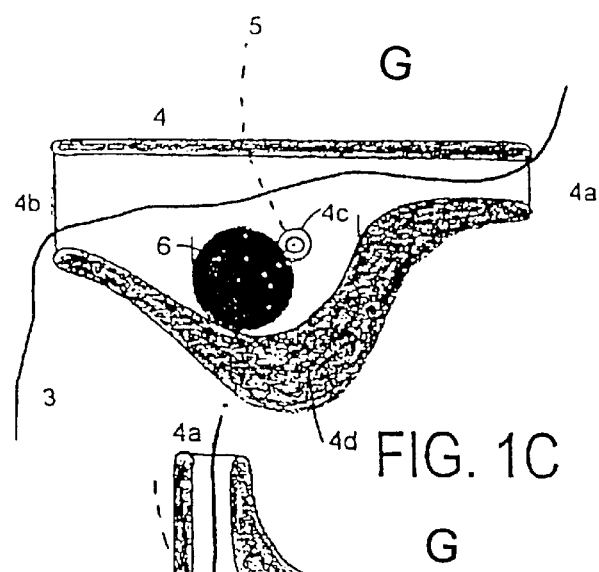
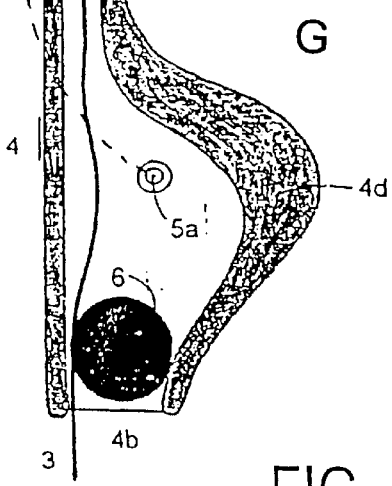
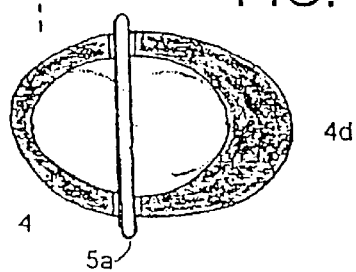

ACCESSORY FOR A FISHING ROD

FIELD OF THE INVENTION

The invention relates to an accessory or add-on unit for a fishing rod for adjusting the depth of cast bait, it being possible for said depth adjustment to be changed as desired at any time. The add-on unit can be used to supplement conventional fishing tackle by being fastened on the traditional float. As a straight-forward and small add-on part, it makes it possible for the angler to regulate or vary the floating depth of the bait as desired at any time without having to repeat the bait-casting operation. As a result, it is also possible, in particular, for the bait to be held continuously immediately or at a certain height "above the bottom".

BACKGROUND

The angler usually attempts to give the bait to the fish if possible "just above the bottom", but at least at a deliberately selected (usually small) distance from the bottom of the body of water.

Up until now, however, such specific positioning of the bait with satisfactory precision has not be practicable.

It is known from the prior art first of all by means of one (or usually more than one) cast plumb line, or with the aid of other laborious procedures, to determine the depth of the body of water in order then to adjust the distance between the bait and traditional floats (i.e. the bait-retaining float) in accordance with the desired distance above the bottom of the body of water. This procedure, however, is time-consuming and inaccurate, and the resulting measured value can only be applied unreliably, and at best approximately, to the distance between the bait and traditional floats. In addition to this, it is not possible in practice, in particular with a relatively large distance from the angler, to coordinate in any reliable manner the respective immersion locations of the trial cast and the cast bait. Furthermore, it is not usually possible to count on a relatively extensive fished body of water to be of ideally constant depth.

It is thus not possible at present for the floating depth of the bait to be regulated in a desired manner once the bait has been cast.

The present invention provides a new and improved add-on unit for a fishing rod that makes it possible for the floating depth of the bait to be changed in a desired manner at any time once the bait has been cast. The intention is also for the add-on unit to be of uncomplicated construction, to be capable of production at low cost, not be susceptible to malfunctioning and to be of small dimensions and not visible to the fish.

SUMMARY OF THE INVENTION

According to an illustrated embodiment of the invention an add-on unit connectable to a float is provided for controlling the depth to which a fishing line descends. The unit comprises a line guiding assembly and a pivot structure coupling a float to the assembly. The pivot structure couples the float and assembly so that when the float is floating on the surface of a body of water the assembly is at least partially submerged and pivotable relative to the float between first and second positions. The line guiding assembly comprises a guide body and a line clamping body disposed within the guide body. The guide body defines an inlet opening, an outlet opening, and an enlarged cavity communicating with the inlet and outlet openings so that a fishing line can extend through the openings and the cavity. The clamping body has a density greater than that of water and is gravity biased to clamp a fishing line between the guide body and the clamping body when the assembly is in its first position so that the depth to which the fishing line extends can not be increased. The clamping body is gravity biased away from clamping engagement with the fishing line when the assembly is in its second position so that the fishing line may move through the guide body to change the depth to which the line extends.

The accessory or add-on unit according to the invention is distinguished by a hollow body which can be connected tiltably to a traditional float, can be submerged in water and is provided with an inlet opening and an outlet opening for a fishing line. The hollow body has an inner cavity which is located between the inlet and outlet openings and is intended for receiving a freely movable, submersible clamping body, for example a ball or a roller. The hollow body is configured such that actuation of the fishing line makes it possible for it to be tilted between a vertical position, in which the fishing line is clamped firmly, and a horizontal position, in which the fishing line can be moved and, in particular, let out in the downward direction, with the result that, in the vertical position, the fishing line is clamped by the clamping body, whereas, in the horizontal position, it is released by the clamping body. These features make it possible for the angler, by actuation of the fishing line, to select, for example, the horizontal position of the hollow body, with the result that the fishing-line through-passage is released by the clamping body and the bait can sink freely. Upon adjustment of the vertical position of the hollow body, the fishing-line through-passage is blocked by means of the clamping body, with the result that the bait is prevented from sinking further. This makes it possible, merely by appropriate actuation of the fishing line, either to arrest or to change again at any time the position of the bait above the bottom.

The accessory or add-on unit according to the invention is an apparatus which is extremely uncomplicated in terms of construction and is therefore not particularly costly, and which is not susceptible to malfunctioning, may be of small dimensions and can be used without difficulty. The add-on unit can be used without any modification to the conventional fishing tackle (rod, reel, fishing line, traditional float, lead weight(s), etc.) and makes it possible even for the unpracticed individual to raise the bait again by a desired amount, for example once it has come into contact with the bottom, and subsequently to correct as desired the—thus initially consolidated—bait position without renewed casting. Of course, further corrections or changes in position (distance above the bottom) are possible here at any time. These changes may take place to an unlimited extent both in the direction of greater depth and in the direction of lesser depth (possibly "to the bottom" again or "just above the bottom").

The accessory or add-on unit according to the invention essentially constitutes a solid hollow body which is of specific shape and weight distribution and has an inlet opening and an outlet opening, located more or less opposite said inlet opening, for the passage of the fishing line. In a preferred embodiment of the add-on unit, on one side, the wall of the hollow body has a deep trough-like hollow. A freely movable ball is located in this case as clamping body in the interior of the hollow body.

The relative density both of the hollow body and of the ball is higher than that of water, with the result that the hollow body is immersed in the water and, following the immersion in water, is immediately flooded via the inlet and outlet openings.

In the "righted" (vertical) position of the hollow body of the preferred embodiment, i.e. in the position in which the outlet opening is approximately vertically, or at the maximum depth, beneath the inlet opening, the ball, on account of its weight, can fit or wedge loosely into the preferably round funnel-like outlet opening and thus clamp in the fishing line between itself and the annular outlet-opening border. At the same time, it stabilizes the vertical alignment of the hollow body. The pinching and/or arresting effect and the stability of the vertical position of the hollow body inevitably increase with the (outwardly directed) tensile force of the bait.

In the "lying" (horizontal) position of the hollow body, i.e. in the position in which the two openings are approximately at the same depth, the ball rolls, once again following the force of gravity, into the trough-like hollow of the hollow body. This is brought about in that said hollow has passed to the lowest location of the assembly by virtue of the pull exerted in a certain manner on the fishing line by the angler and as a result of the way in which the hollow body is suspended on the traditional float and of the weight distribution of the hollow body. The weight of the ball resting in the trough gives additional stability to the horizontal position of the hollow body during the free through-passage of the fishing line.

In a further preferred embodiment, a pin runs (as a tilting spindle) through the interior of the hollow body transversely to the line connecting the inlet opening and outlet opening of the fishing line and symmetrically in relation to the trough-like hollow. The pin is mounted rotatably in two holes of the wall of the hollow body, said holes being located opposite one another as bearings (cf. FIG. 1). Said pin is part of a bracket which is closed outside the hollow body and is fastened movably on the float by means of an articulation.

The pin is preferably arranged within the cavity such that, in addition to allowing the two alternative stable positions of the hollow body, i.e. the horizontal position or the vertical position, to be produced easily and reliably, it allows the ball to roll back and forth freely between the outlet opening and trough, but keeps said ball away from the immediate surroundings of the inlet opening. In order to predetermine the tilting direction of the hollow body and to prevent the fishing line from looping during casting, the bracket is preferably configured and provided such that it is always on that side of the assembly which is directed away from the trough-like hollow. This can be achieved in that the inlet-opening stub and the outlet-opening stub limit the excursion of the (outer) bracket.

The weight distribution in relation to the hollow body should be dimensioned such that the latter, even when the ball rests in the outlet opening, tends to tilt about the axis of rotation provided that the weight of the bait does not produce a righting torque and consequently—with stabilization brought about together with the ball, which has in the meantime passed to a deeper level and simultaneously stops the fishing-line through-passage—attains the righted position.

Between the tip of the rod and the inlet opening of the hollow body, the fishing line usually runs through an eyelet which is secured on the traditional float and provides little frictional resistance. This eyelet is preferably fitted such that, on the one hand, the pull of the fishing line on the traditional float, said pull taking effect more or less horizontally from the location of the angler, increases the horizontally acting tilting moment but, on the other hand, with the fishing-line through-passage stopped and the traditional float being righted again, the righting of the hollow body is also aided on account of lever action (that is to say ultimately by the bait and ball weight).

It goes without saying that the preferred embodiments of the add-on unit which are described are not mutually exclusive, but may also be combined with one another as desired.

An embodiment of the accessory or add-on unit according to the invention and the functioning of the unit are explained in more detail hereinbelow with reference to an exemplary embodiment in conjunction with the drawings, in which:

FIG. 1 shows an exemplary embodiment of the add-on unit according to the invention in perspective and sectional illustrations;

Figure 2A:
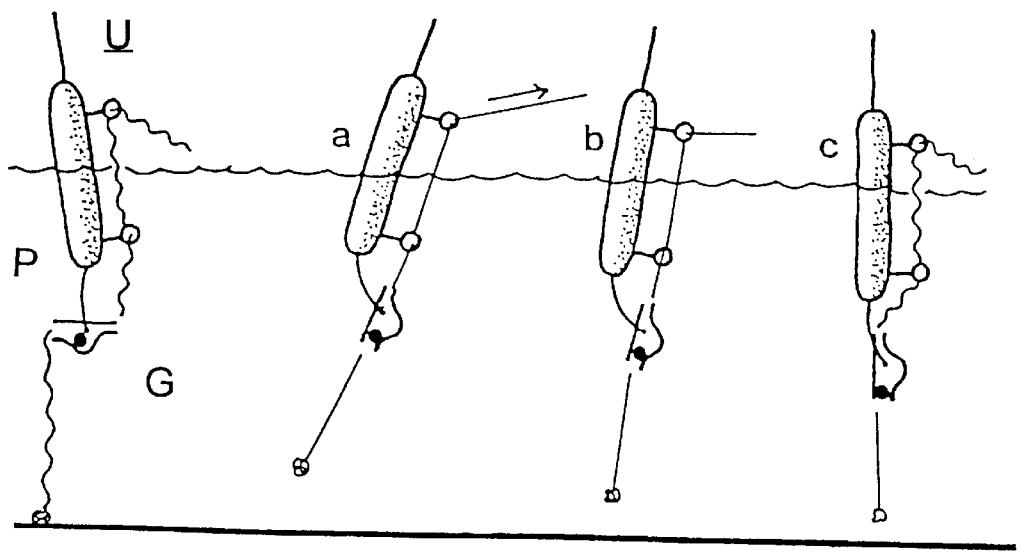
FIG. 2 shows a diagram of the functioning and of the main steps during handling of the add-on unit.

FIG. 1A illustrates an add-on unit U, constructed according to the invention, connected to a conventional float 1 for controlling the depth to which a fishing line 3 extends. The add-on unit U comprises a line guiding assembly G and a pivot structure P coupling the assembly G to the float 1. The line guiding assembly G comprises a hollow line guide body 4 through which the line 3 extends, and a line clamping body 6 within the guide body 4. The pivot structure P is illustrated as comprising a bracket, or suspension means, 5 that is connected to the float 1, and a tilting-spindle 5a that couples the guide body 4 to the bracket 5. The tilting-spindle is mounted through the holes 4c that provide a tilting-spindle bearing in the hollow body. The hollow body 4 also has an inlet opening 4a and an outlet opening 4b for the fishing line 3, which is guided through the eyelet 2, which is fastened on the traditional float 1. On the right-hand side of the figure, two positions of the hollow body 4 are illustrated in a sectional view. The top illustration shows the hollow body in the horizontal position, in which the fishing line 3 has a free through-passage through the hollow body. The illustration likewise illustrates the ball 6, which acts as clamping body and, on account of the force of gravity, is located in the trough provided in the hollow body. Likewise provided at the location of the trough is a wall thickening 4d which increases the stability of the hollow body in this position on account of its weight. Furthermore, the wall thickening may cause the hollow body to tend to tilt horizontally upon neutralization of the bait and ball weight. It may likewise be seen to good effect in the top illustration that, on account of its position within the hollow body, the tilting-spindle, which is mounted in the holes 4c, blocks the path of the ball to the inlet opening 4a.

Said top sectional illustration in FIG. 1 corresponds to the "Go" state, in which the run-out of the fishing line is free, with the result that the bait can sink.

The central sectional illustration in FIG. 1 shows the "Stop" state, in which the run-out of the fishing line is blocked, with the result that the bait is secured in a fixed position above the bottom of the body of water. In this position, the ball 6 blocks the outlet opening 4b and thus wedges the fishing line 3 in.

Finally, the bottom sectional illustration shows a view from the outlet opening 4b to the inlet opening 4a. It can also clearly be seen here that the tilting spindle 5a bars the free through-passage between the outlet and inlet openings for the ball, of which the diameter is indicated schematically.

By virtue of its specific shape and the relative (asymmetric) weight distribution, as shown in FIG. 1, the hollow body assumes either the upright (vertical) or the transverse (horizontal) stable position by way of suitable exertion of the pull on the fishing line, i.e. by way of the fishing rod being moved and/or held appropriately.

The first-mentioned adjustment means that the fishing line, loaded by the bait, is fixed in the apparatus as a result of the ball moving and pressing slightly into the outlet opening (central illustration in FIG. 1). The latter adjustment, on account of the ball moving out of the outlet opening, eliminates the obstruction of the fishing-line through-passage and allows the bait to sink freely (top illustration in FIG. 1).

The changeover from "Stop" (vertical position of the hollow body) to "Go" (horizontal position of the hollow body) takes place in that, by virtue of rod actuation with raising action, the fishing line being shortened slightly and freed from the arresting means in the hollow body, the tilting force is imparted a weight in excess of the bait and ball weight directed toward the bottom of the body of water. The following rod movement, yielding without resistance and totally relieving the fishing line of stress, allows the assembly—before the raised bait executes its tensile force in the direction of the bottom of the body of water again—to tilt fully into the horizontal and thus allows the fishing line to run out without obstruction. This manipulation may be described as a whole as a (sudden, but nevertheless controlled and gentle) "jerking movement". If this fishing-line excursion takes place with sufficient force, then the traditional float and thus also the hollow body, which is drawn toward the deeper-submerged eyelet, are moved all the more in the horizontal direction, especially since the full weight of the bait, briefly jerked up to an excessive extent in such a way, only exerts pull on the fishing line again when the ball has already assumed its position in the trough, said position stabilizing the horizontal position of the hollow body.

If in contrast, in order to change over from "Go" to "Stop", the fishing-line through-passage caused by the bait weight is stopped suddenly by the angler at a freely selected point in time, the hollow body is immediately righted on account of the lever action, and is rotated about the tilting spindle in the process. Provided the angler only releases the fishing line in this phase once the entire bait weight takes effect on the hollow body, i.e. allows said line to run out with well-regulated tensioning, the ball resumes the position in the outlet opening and blocks the through-passage of the fishing line. The bait weight, together with the ball weight, thus maintains the stable vertical position of the assembly.

This changeover between the horizontal position of the hollow body, i.e. with the fishing line running freely, and vertical position of the hollow body, i.e. with the fishing line arrested, can be repeated as frequently as desired and at any time. The bait-raising operation and the bait-sinking operation may be extended as desired and the extent to which the position of the bait is changed may be determined without limitation—as far as the subsequent position of said bait "on the bottom" and possibly again "just above, or at any desired height above, the bottom".

Of course, it is also possible for a fishing-rod movement which begins gently and is continued to any desired extent, raising the bait to a gradual stop, to secure the fishing line again in the hollow body, and thus the bait in a correspondingly changed position, directly, without an intermediate "Go" phase.

Figure 2B:
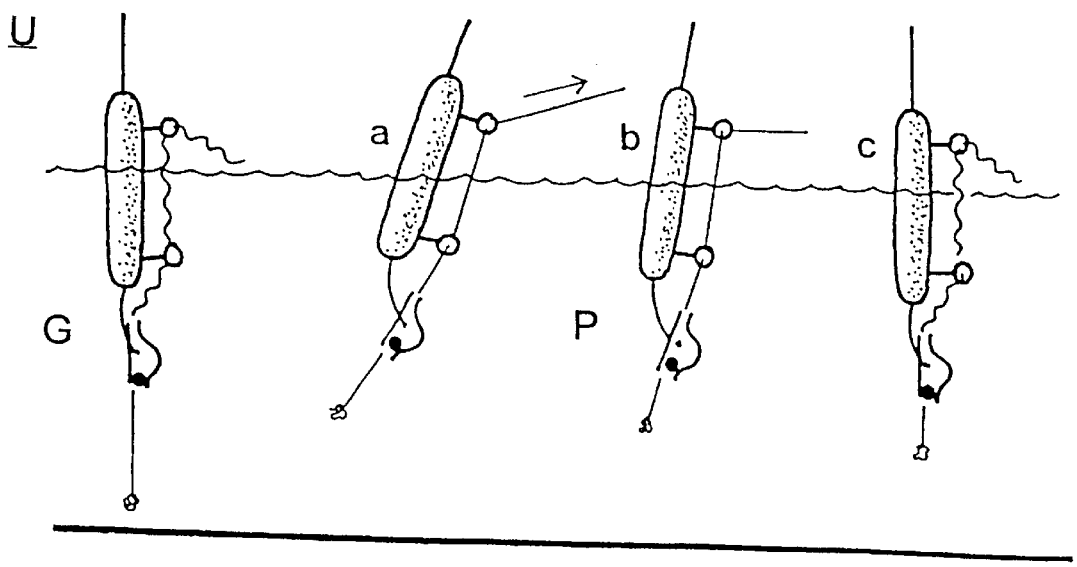
Figure 3A:
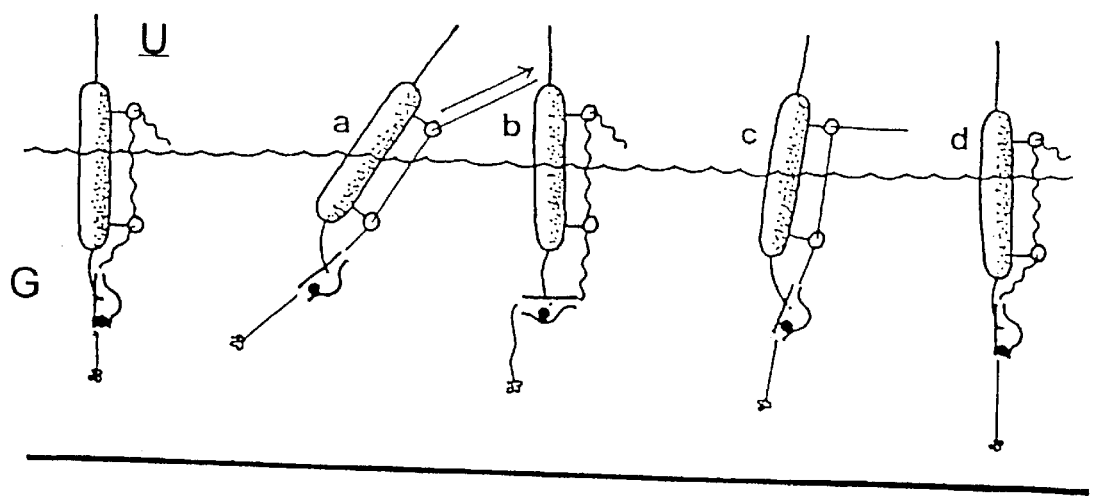
FIG. 3 shows a further diagram of the functioning and of the main steps during the handling of the add-on unit.
Figure 3B:
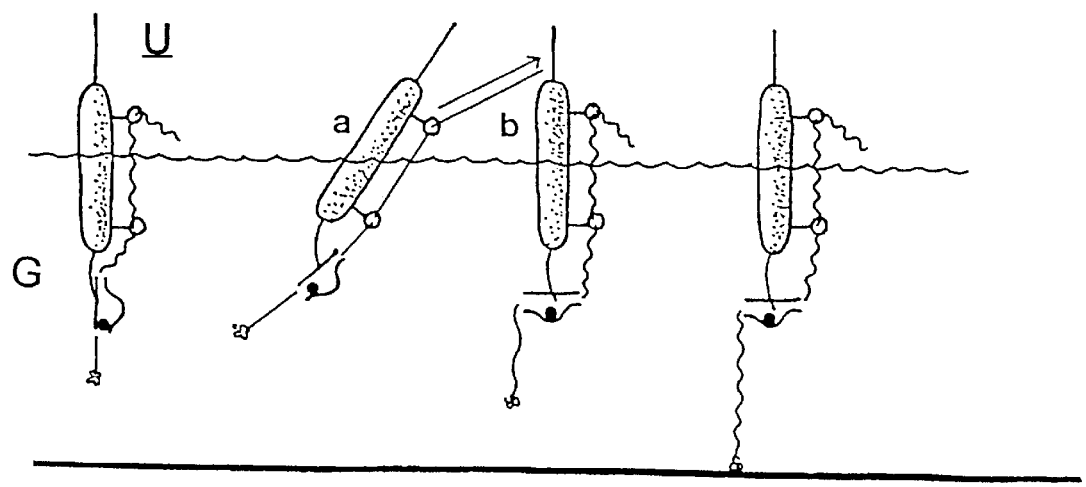

FIGS. 2 and 3 each describe the main steps during the handling of the add-on unit.

FIG. 2 shows, in the top part, the operations of raising the bait from the bottom of the body of water and fixing it "above the bottom" or at any desired distance from the bottom of the body water, thus making it possible for the bait depth to be selected freely. The starting position of the bait at the bottom of the body of water and with the fishing line relieved of stress can be seen in the left-hand part of the illustration. In step a), the pulling-in action takes place, the fishing line being gradually tensioned gently in the process. At point b), the fishing line is brought to a stop, the tensioning of the line being maintained in the process. Finally, in step c), the fishing line is released (relaxed) in a delayed manner, with the result that the ball passes into its arresting position again and the bait is thus secured at a certain depth above the bottom of the body of water.

The operations of raising and fixing again the (already floating) bait at a greater distance from the bottom of the body of water (with free selection of the bait depth) is presented in the bottom part of FIG. 2. In the starting position, the bait is located in this case, as can be seen on the left-hand side, at a certain distance from the bottom of the body of water. In step a), the pulling-in action of the fishing line takes place, the fishing line being gradually tensioned gently in the process. In step b), the fishing line is brought to a stop, the tensioning being maintained in the process. Finally, in step c), delayed release (relaxing of the fishing line) takes place, with the result that the bait is fixed in a higher position. Of course, it is also possible first of all to allow the bait to sink to the bottom and then to bring it to the desired height in the form illustrated.

FIG. 3 shows, in the top illustration, the operations of sinking and fixing again the floating bait at a lesser distance from the bottom of the body of water (with free selection of the bait depth). In the starting position (left-hand image), the bait is located in an elevated position above the bottom of the body of water, with the fishing line held loosely. In step a), the fishing line is pulled in with force, and is tensioned abruptly in the process. In this case, the hollow body, together with the traditional float, assumes a more or less horizontal position. In step b), the fishing line is released suddenly, and is completely relieved of stress in the process, with the result that the traditional float is righted. This results in the hollow body sinking and being relieved of the bait weight and thus tilting into the horizontal. The fishing line may then run out freely, with the result that the bait sinks. By virtue of the running-out fishing line being brought to a stop in step c), the hollow body is brought into the more or less vertical position again. In step d), the fishing line is released (relaxed) in a delayed manner, as a result of which it is fixed by the ball, with the result that the bait is held at a fixed height above the bottom of the body of water.

The bottom illustration in FIG. 3 relates to the floating bait sinking to the bottom of the body of water. In this case, in step a), the fishing line is pulled in with force, and is tensioned abruptly in the process. In step b), the fishing line is then released suddenly, and is completely relieved of stress in the process, with the result that the hollow body tilts into the horizontal position and remains there on account of the weight distribution (ball and shape of the hollow body). As a result, the fishing line can be moved freely and the bait can sink to the bottom.

The add-on unit ("bait lift") described can be used in a range of different sizes, adapted to the fishing tackle, from a few millimeters to centimeters. The dimensions in this case are coordinated with the bait weight and/or the load-bearing capacity of the traditional float, the thickness of the fishing line, and possibly the speed at which the body of water flows, etc.

With respect to more extreme conditions, it is also possible for the weight provided in the region of the trough of the hollow body, said weight causing the horizontal tilting of the hollow body and stabilizing the horizontal position of the same—until the possible righting manipulation takes place—to be made capable of changing in a simple manner. This can take place, for example, by providing lead balls or the like as required, by displacing a weight provided on the trough-side surface of the hollow body, by shifting the tilting spindle, etc.

The righting leverage ratios, which are determined by the distance of the inlet-opening stub and/or outlet-opening stub from the axis of rotation, may be varied during production and possibly configured such that they can be changed on the unit during use.

The unit may be produced as an integrated constituent part of a specific traditional float or else as a clamp-on or exchangeable add-on part which merely supplements an existing traditional float.

The hollow body may possibly be designed such that it can be opened and fitted together, for example, for cleaning or for exchanging the ball. However, in view of the very inexpensive production of the unit, for example using plastic, this may not be economically viable.

The functioning of that embodiment of the add-on unit which is presented in FIGS. 1 to 3 is summarized again hereinbelow.

The ball provided in the hollow body, rolling in the trough-like hollow, releases the fishing-line through-passage when the hollow body is aligned horizontally ("Go" phase), but blocks or arrests the fishing-line through-passage, and thus prevents the bait from passing to a deeper level, when the hollow body is aligned vertically ("Stop" phase), in that it shifts into the round and funnel-like outlet opening—which has now passed to the lowermost point—and wedges the fishing line in there. The pressure by which the fishing line is pressed onto the wall of the hollow body in this vertical position of the hollow body increases with the weight of the bait.

Both with the vertical position of the hollow body and with the horizontal position of the same, this position stabilizes on account of the ball weight acting on the entire system (and, in the case of the vertical alignment of the hollow body, by the weight of the bait as well).

The changeover operation, i.e. the tilting of the hollow body from one of the two predetermined stable positions into the other (vertical and horizontal), is caused by the manipulation of the fishing rod, i.e. the pull on the fishing line. Whereas a constant and gently relaxing pull on the fishing line, said pull raising the bait, brings about and/or retains the vertical alignment (tilting) of the hollow body and blocks the fishing-line through-passage, a brief forced and then abruptly interrupted (overall jerking) pull on the fishing line results in loosening and temporary weight "neutralization" of the ball, and simultaneously in the horizontal alignment (tilting) of the hollow body. This, in turn, results in the release of the fishing-line through-passage and, consequently, in the bait sinking until the moment at which the fishing line is stopped, that is to say the hollow body is righted, with the bait being fixed again.

What is claimed is:

1. An add-on unit connectable to a float for controlling the depth to which a fishing line descends, the unit comprising:
   a. a line guiding assembly having a density greater than water; and,
   b. pivot structure coupling a float to said assembly so that when the float is floating on the surface of a body of water said assembly is at least partially submerged and pivotable relative to the float between first and second positions;
   c. said line guiding assembly comprising:
      i. a guide body defining an inlet opening, an outlet opening, and an enlarged cavity communicating with said inlet and outlet openings so that a fishing line can extend through said openings and said cavity; and,
      ii. a clamping body disposed within said guide body, said clamping body having a density greater than that of water, said clamping body gravity biased to engage a fishing line extending through said assembly and clamp the line between the guide body and the clamping body when said assembly is in said first position so that the depth to which the fishing line extends can not be increased, said clamping body gravity biased away from clamping engagement with the fishing line when said assembly is in said second position so that the fishing line may move through said guide body to change the depth to which the line extends.

2. The unit claimed in claim 1 wherein said inlet and outlet openings are substantially aligned, said inlet opening spaced vertically above said outlet opening when said assembly is in said first position, said openings spaced horizontally apart when said assembly is in said second position.

3. The unit claimed in claim 1 wherein the float has a lower end disposed beneath the surface of the water when the float is floating, said pivot structure comprising a bracket attached to the float adjacent the lower end and pivoted to said guide body.

4. The unit claimed in claim 3 wherein said bracket comprises at least a tilting spindle and said guide body defines tilting spindle receiving holes, the spindle receiving holes forming bearings for enabling tilting of the assembly between said positions.

5. The unit claimed in claim 3 wherein said guide body defines third and fourth openings communicating with said cavity, said bracket defining a spindle extending through said third and fourth openings and into said cavity, said spindle engaging and blocking said clamping body from clamping the line against said guide body adjacent said inlet opening.

6. The unit claimed in claim 1 wherein said cavity defines a trough-like hollow for receiving said clamping body when said assembly is in said second position.

7. The unit claimed in claim 1 wherein said clamping body is formed by a ball that is freely movable relative to said guide body within said cavity.

* * * * *